H. W. SEVERANCE AND G. F. HEMPHILL.
MIRROR HOLDER.
APPLICATION FILED MAR. 15, 1920.
1,386,959.
Patented Aug. 9, 1921.
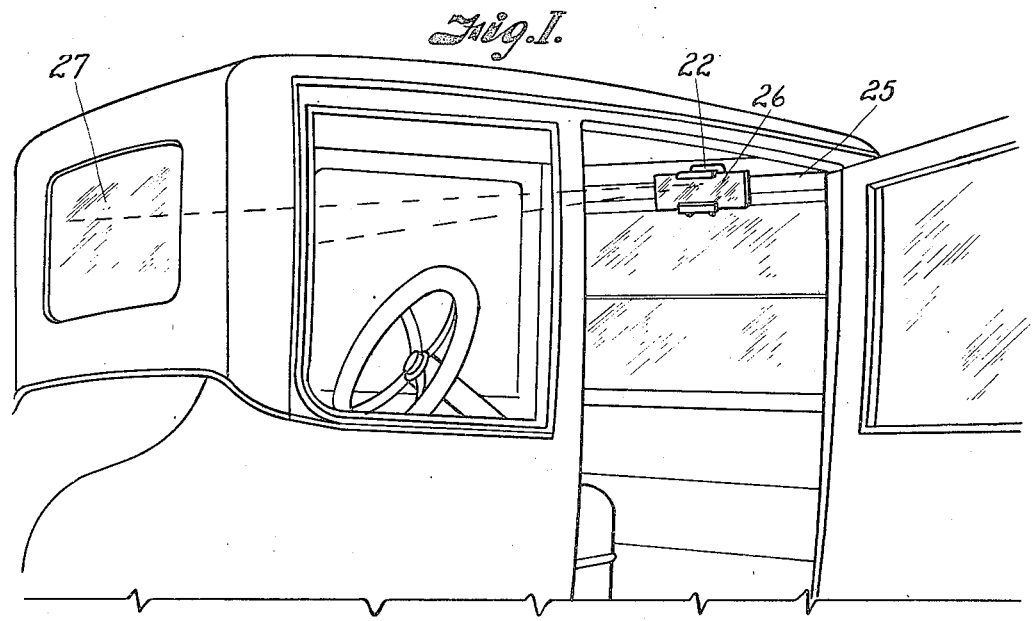
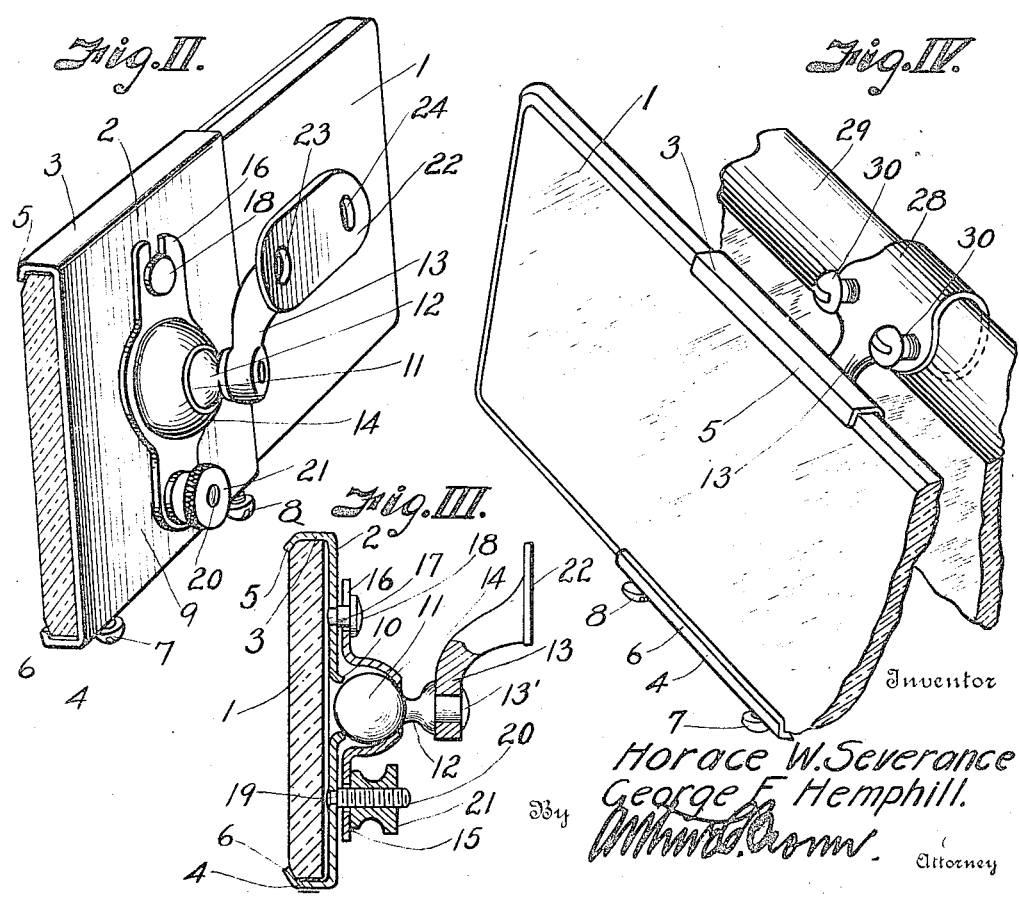
Inventor
Horace W. Severance
George F. Hemphill.
By
Attorney

UNITED STATES PATENT OFFICE.

HORACE W. SEVERANCE AND GEORGE F. HEMPHILL, OF KANSAS CITY, MISSOURI, ASSIGNORS, BY MESNE ASSIGNMENTS, TO ELLIOTT-NICHOLS MANUFACTURING COMPANY, OF KANSAS CITY, MISSOURI, A COPARTNERSHIP.

MIRROR-HOLDER.

1,386,959.

Specification of Letters Patent.   Patented Aug. 9, 1921.

Application filed March 15, 1920. Serial No. 365,704.

*To all whom it may concern:*

Be it known that we, HORACE W. SEVERANCE and GEORGE F. HEMPHILL, citizens of the United States, residing at Kansas City, in the county of Jackson and State of Missouri, have invented certain new and useful Improvements in Mirror-Holders; and we do declare the following to be a full, clear, and exact description of the invention, such as will enable others skilled in the art to which it appertains to make and use the same, reference being had to the accompanying drawings, and to the letters and figures of reference marked thereon which form a part of this specification.

This invention relates to a mirror support and particularly to a "rear vision mirror" for motor vehicles and the like.

One of the objects of the invention is to provide a mirror holder adapted to be conveniently attached to a suitable support and which is so constructed that the mirror may be tilted at any angle within limits and to provide the adjustment in a simple and expeditious manner so that the parts will not rattle as the vehicle travels over the road bed.

It is also the purpose of our invention to provide efficient frictional engagement between the coöperating parts, the tension of which may be controlled and to provide a construction which will insure the maintenance of the mirror at any angle to which it may be adjusted.

In the drawings,

Figure I is a view partly in perspective of the interior of a motor vehicle to which our invention is attached.

Fig. II is a perspective view of a mirror and holder constructed in accordance with our invention, the mirror being shown in section.

Fig. III is a cross sectional view through the mirror and holder, and

Fig. IV is a perspective view of my invention involving a slightly modified form of bracket.

The mirror 1 may be held in a suitable frame or holding member 2, provided with top and bottom outwardly projecting flanges 3 and 4, having in-turned edges 5 and 6 to form grooves in which the mirror may be received and held in place by the fastening devices shown as screws 7 and 8, passing through the flanges 4.

Centrally of the body portion of the frame 2 the plate designated 9 is struck out to form a seat 10, consisting of an outwardly projecting, annular flange adapted to receive the ball or head 11 on the shank 12 of the bracket member 13, the ball being held upon its seat by a socket member 14, consisting of a plate having an opening or hole 15 near one end and slotted or bifurcated as at 16 at its other end. The bifurcated or slotted portion 16 is adapted to engage the shank 17 of a headed pin 18, rigidly carried by the plate 9 and there is a threaded pin or projection 19 extending from the plate 9 and adapted to pass through the opening 15 of the plate, the shank of the pin 19 being threaded as at 20 to receive a jam or tension nut 21, to bear against the face of the plate so that when the bifurcated portion engages the shank of the headed pin 17, the tension nut may be screwed upon the threads 20 to force the socket 14 into engagement with the ball or head 11 and force it against the seat 10, the inner face of the socket 14 also offering frictional resistance to the turning of the head 11. The bracket may be provided with a securing plate 22 having screw holes or openings 23 and 24 by means of which the bracket 13 may be fastened to a suitable support, for example, the upper rail 25 of a closed car so that the face 29 will reflect objects from the rear of the car.

In actual practice I prefer to construct the head 11, the shank 12 and the bracket 13 rigidly together, preferably by riveting the shank to the bracket as at 13'. In assembling the bracket 13, head 12 and the clamping device, the shank 12 is first slipped through the opening in the clamping device, and then riveted to the bracket as shown at 13'.

When the bracket is in place, that is, secured to its support, and the head held rigidly against the seat 10, the mirror frame 2 may be held in any adjusted position. If it is desired to change the angle of the mirror and the friction between the head 11, the seat 10 and the socket 14 is too great to permit the angle to be changed, the tension plate may be slightly loosened; that is, by unscrewing the nut 21, the tension can be taken off the plate and consequently off the head. Then the angle may be changed to any position within extremes and the jam nut may be screwed tight against the plate, reëstablishing sufficient friction against the head to prevent accidental movement of the mirror frame away from its adjusted position.

If the mirror is screwed to the top rail 25 of a sedan or closed car, it may be adjusted so that objects in rear of the car may be reflected through the rear window or opening 27 and into the face 26 of the mirror 1.

If the mirror is to be used in connection with a touring car or open car, the bracket for securing it to its support will be slightly modified. Instead of the plate 22, there will be a hook-shaped jaw 28 formed on the bracket, the jaw being adapted to fit over the top rail of the windshield 29 and secured thereto by set screws or fastening devices 30. The remaining construction of the holder will be the same as illustrated in Figs. II and III; that is, the construction may be generally the same, it being understood, of course, that any equivalent structure adapted to perform the functions of the device illustrated is contemplated as being within the scope of the invention.

What we claim and desire to secure by Letters-Patent is:

In a mirror holder, a plate, a bracket, a tension device for adjustably securing the bracket to said plate, having means intermediate its ends for engaging said bracket, having a slot at one end for receiving a headed pin, and having an opening at the opposite end, a headed pin on said plate for engaging the slot, a threaded pin adjacent said first named pin for engaging the opening, and a jam nut on the end of the last named pin for adjusting the tension of the clamping device.

In testimony whereof we affix our signatures.

HORACE W. SEVERANCE.
GEORGE F. HEMPHILL.